US012806110B2

(12) United States Patent
Dillard

(10) Patent No.: US 12,806,110 B2
(45) Date of Patent: Nov. 24, 2026

(54) MAGNETIC DEVICE FOR AMBULATORY GAIT CONTROL

(71) Applicant: The United States Government as represented by the Department of Veterans Affairs, Washington, DC (US)

(72) Inventor: Ebony Starlyn Dillard, Aiken, SC (US)

(73) Assignee: THE UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 636 days.

(21) Appl. No.: 18/104,823

(22) Filed: Feb. 2, 2023

(65) Prior Publication Data

US 2023/0285217 A1 Sep. 14, 2023

Related U.S. Application Data

(60) Provisional application No. 63/317,566, filed on Mar. 8, 2022.

(51) Int. Cl.
*A61H 3/00* (2006.01)

(52) U.S. Cl.
CPC ......... *A61H 3/00* (2013.01); *A61H 2003/007* (2013.01); *A61H 2201/1642* (2013.01); *A61H 2205/12* (2013.01)

(58) Field of Classification Search
CPC ................ A61H 3/00; A61H 2003/007; A61H 2201/1642; A61H 2201/1207; A61H 2201/164; A61H 2201/165; A61H 2201/168; A61H 2205/12; A61B 5/112; A61F 5/01
See application file for complete search history.

(56) References Cited

U.S. PATENT DOCUMENTS

| | | | | |
|---|---|---|---|---|
| 5,782,743 | A | 7/1998 | Russell | |
| 10,524,972 | B2 * | 1/2020 | Amundson | A61H 1/0244 |
| 2002/0183670 | A1 | 12/2002 | Driver | |
| 2008/0188706 | A1 | 8/2008 | Gonet | |
| 2010/0056846 | A1 | 3/2010 | Friberg | |
| 2012/0124867 | A1 * | 5/2012 | Heinrich | A43B 1/0054 434/260 |
| 2016/0338621 | A1 * | 11/2016 | Kanchan | A61B 5/11 |
| 2017/0196723 | A1 * | 7/2017 | Spencer | A61N 2/12 |
| 2019/0059517 | A1 * | 2/2019 | Milton | A43B 23/24 |
| 2020/0276041 | A1 | 9/2020 | Spencer | |

FOREIGN PATENT DOCUMENTS

| | | |
|---|---|---|
| CN | 204599482 U | 9/2015 |

* cited by examiner

*Primary Examiner* — Brandy S Lee
*Assistant Examiner* — Kelsey Rhee
(74) *Attorney, Agent, or Firm* — Ballard Spahr LLP

(57) ABSTRACT

A device for controlling aspects of ambulatory (walking) gait control during physical therapy uses magnetic bodies, one worn on each ankle of the user. The magnet polarity of each body facing toward the median plane of the user is the same, and thus the magnetic bodies repel one another when in proximity to prevent the feet from crossing over one another during the swing phase of the walking gait and thereby reduce the potential for falls due to tripping.

31 Claims, 10 Drawing Sheets

MAGNETIC DEVICE FOR AMBULATORY GAIT CONTROL

CROSS REFERENCE TO RELATED APPLICATION

This application is based upon and claims benefit of priority to U.S. Provisional application No. 63/317,566, filed Mar. 8, 2022, which application is hereby incorporated by reference herein.

FIELD OF THE INVENTION

This invention relates to devices for providing improved ambulatory (walking) gait control during physical therapy as well as unsupervised exercise in the home, workplace or gymnasium.

BACKGROUND

Difficulty walking can be attributed to a number of causes such as hip adduction during the swing phase of the walking gait cycle due to muscle weakness, muscular atrophy due to stroke or other neurological deficits, sensory impairments due to diabetes, patients who suffer from Parkinson's disease or spinal cord injury as well as balance deficits. Fall risk is greater for such patients during physical therapy as the legs may tend to cross while walking during the swing phase of their gait, causing the patient to trip and fall. This risk is present even when assistive devices such as walkers, canes and crutches are used. There is an opportunity to prevent serious injury caused by falls due to tripping by preventing the legs of a patient from crossing while walking through control of the patient's gait.

SUMMARY

The invention concerns a device for controlling aspects of a walking gait of a user. The device is attachable proximate to the feet of the user. In an example embodiment the device comprises a first magnetic body adapted to attach proximate to a medial side of a left foot of the user. A second magnetic body is adapted to attach proximate to a medial side of a right foot of the user such that the first and second magnetic bodies are oppositely disposed from one another across a median plane of the user in facing relation to one another. The first magnetic body has a first magnetic pole facing away from the left foot, and the second magnetic body has a second magnetic pole facing away from the right foot. The first and second magnetic poles having the same magnetic polarity to repel the right and left feet from one another when the first and second magnetic bodies are in proximity to one another.

In an example embodiment, each first and second magnetic bodies comprises a pouch. A strap is attached to the pouch for cinching the pouch to one of the left or right legs. At least one magnet is retained within the pouch. By way of example, each pouch is adapted to be positioned adjacent to a lateral malleolus of each foot respectively. In an example embodiment, the at least one magnet may comprise a permanent magnet. Further by way of example, the pouch may comprise a lug positioned on a first side of the pouch. The strap is positioned on a second side of the pouch opposite to the first side. The strap has a hook and loop attachment wherein the hooks are positioned on a first side of the strap and the loops are positioned on a second side of the strap opposite to the first side, the strap being sized to pass through the lug.

In an example embodiment the pouch may be adapted to receive a plurality of the magnets. The magnets may be arranged in side by side relation. In a specific example, two magnets may be positioned within the pouch.

In another example embodiment, each first and second magnetic body comprises a frame. A first compartment is defined by the frame and a first magnet is received within the first compartment. A second compartment is defined by the frame and a second magnet is received within the second compartment. The first and second compartments are arranged adjacent to one another in this example. A first lug is positioned on a first end of the frame adjacent to the first compartment. A second lug is positioned on a first side of the frame and located between the first and second compartments. A third lug is positioned on a second side of the frame opposite to the second lug. A first strap is attached to the second lug, and a second strap is attached to the third lug. The first and second straps are engageable with one another to affix the frame proximate to the medial sides of the feet in this example.

In a specific example embodiment the first and second straps may comprise hook and loop fasteners. Further by way of example, the first straps on each frame are adapted to extend, respectively, beneath the left and right feet of the user and pass over the feet to engage the second straps. Also by way of example, the second straps are adapted to extend, respectively around an anterior of ankles of the left and right feet to engage the first lugs, each second strap attaching to itself to affix the frames proximate to the left and right feet, respectively. An example embodiment may also comprise a fourth lug positioned on a second end of the frame adjacent to the second compartment.

The frame may comprise a non-magnetic material, and the first and second magnets may comprise permanent magnets.

In an example embodiment the frame has a centerline extending from the first to the second ends. The first and second compartments are arranged offset from the centerline. An example embodiment may further comprise a third compartment extending from the first side of the frame adjacent to the first compartment. A third magnet is received within the third compartment. A fourth compartment may also extend from the first side of the frame adjacent to the second compartment. A fourth magnet is received within the fourth compartment.

By way of example the device may further comprise a fifth compartment positioned between the first lug and the first compartment, a fifth magnet being receive within the fifth compartment; a sixth compartment positioned between the first compartment and the second and third lugs, a sixth magnet being received within the sixth compartment; a seventh compartment positioned between the second and third lugs and the second compartment, a seventh magnet being received within the seventh compartment; and an eighth compartment positioned between the second compartment and a fourth lug positioned on a second end of the frame adjacent to the second compartment, an eighth magnet being received within the eighth compartment.

In an example embodiment the third and fourth magnets are angularly oriented with respect to the first and second magnets, respectively.

In another example embodiment, the frame has a centerline extending from the first to the second ends, and the first and second compartments are arranged in alignment with the centerline. A third compartment may extend from the first side of the frame adjacent to the first compartment, a third magnet being received within the third compartment; a fourth compartment may extend from the first side of the frame adjacent to the second compartment, a fourth magnet being received within the fourth compartment; a fifth compartment may extend from the second side of the frame adjacent to the first compartment, a fifth magnet being received within the fifth compartment; and a sixth compartment may extend from the second side of the frame adjacent to the second compartment, a sixth magnet being received within the sixth compartment in this example.

Further by way of example, a seventh compartment may be positioned between the first lug and the first compartment, a seventh magnet being received within the seventh compartment; an eighth compartment may be positioned between the first compartment and the second and third lugs, an eighth magnet being received within the eighth compartment; a ninth compartment may be positioned between the second and third lugs and the second compartment, a ninth magnet being received within the ninth compartment; and a tenth compartment may be positioned between the second compartment and a fourth lug positioned on a second end of the frame adjacent to the second compartment, a tenth magnet being received within the tenth compartment.

By way of example, the third and fifth magnets may be angularly oriented with respect to the first magnet and the fourth and sixth magnets may be angularly oriented with respect to the second magnet.

Another example embodiment according to the invention may comprise a frame having a first compartment defined by the frame and a first magnet received within the first compartment; a second compartment defined by the frame and a second magnet received within the second compartment, the first and second compartments being arranged adjacent to one another; a third compartment defined by the frame and a third magnet received within the third compartment; a fourth compartment defined by the frame and a fourth magnet received within the fourth compartment, the third and fourth compartments being arranged adjacent to one another. In an example device a first lug is positioned on a first end of the frame adjacent to the first and second compartments; a second lug is positioned on a first side of the frame and located between the first and third compartments; and a third lug is positioned on a second side of the frame opposite to the second lug and positioned between the second and fourth compartments. A first strap is attached to the second lug and a second strap is attached to the third lug in this embodiment. The first and second straps are engageable with one another to affix the frame proximate to the medial sides of the feet.

In an example embodiment the first and second straps may comprise hook and loop fasteners. Further by way of example the first straps on each frame are adapted to extend, respectively, beneath the left and right feet of the user and pass over the feet to engage the second straps, and the second straps are adapted to extend, respectively around an anterior of ankles of the left and right feet to engage the first lugs. Each second strap attaches to itself to affix the frames proximate to the left and right feet, respectively.

By way of example the frame may further comprise a fourth lug positioned on a second end of the frame adjacent to the third and fourth compartments. The frame may comprise a non-magnetic material and the first, second, third and fourth magnets may comprise permanent magnets.

In an example embodiment the frame has a centerline extending from the first to the second ends. The first and second compartments are arranged offset from the centerline, as are the third and fourth compartments in this example.

The example may further comprise a fifth compartment extending from the first side of the frame adjacent to the first compartment, a fifth magnet being received within the fifth compartment; a sixth compartment extending from the first side of the frame adjacent to the third compartment, a sixth magnet being received within the sixth compartment; a seventh compartment extending from the second side of the frame adjacent to the second compartment, a seventh magnet being received within the seventh compartment; and an eighth compartment extending from the second side of the frame adjacent to the fourth compartment, an eighth magnet being received within the eighth compartment.

Additionally an example device may comprise a ninth compartment positioned between the first lug and the first and second compartments, a ninth magnet being received within the ninth compartment; a tenth compartment positioned between the first and second compartments and the second and third lugs, a tenth magnet being received within the tenth compartment; an eleventh compartment positioned between the second and third lugs and the third and fourth compartments, an eleventh magnet being received within the eleventh compartment; and a twelfth compartment positioned between the second and third compartments and a fourth lug positioned on a second end of the frame adjacent to the second and third compartments, a twelfth magnet being received within the twelfth compartment.

DETAILED DESCRIPTION

Figure 1:
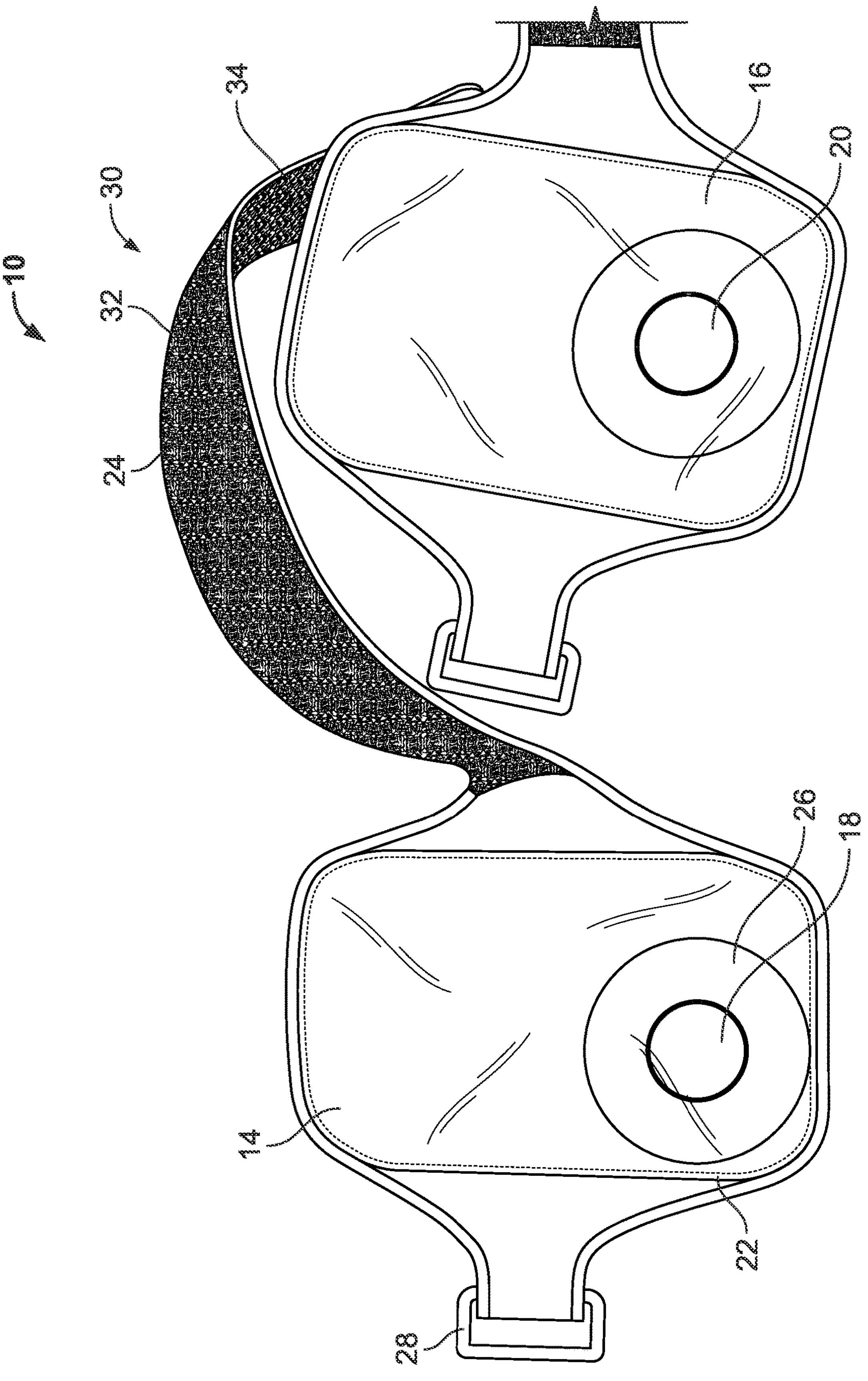
FIG. 1 is a plan view of an example device for ambulatory gait control according to the invention.
Figure 2:
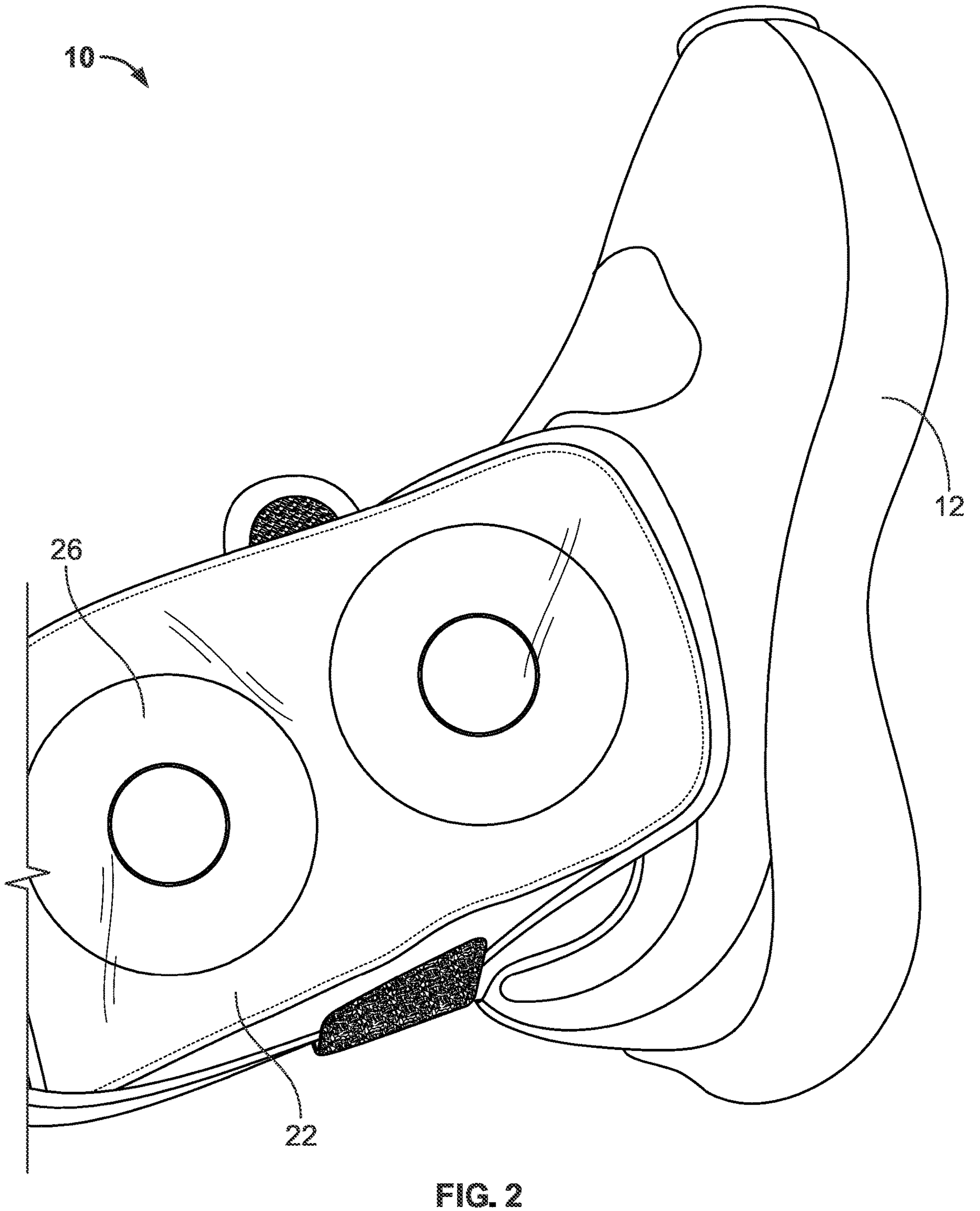
FIG. 2 is an isometric view of the device shown in FIG. 1 being worn by a user.

FIG. 1 shows an example device 10 for controlling aspects of a walking gait of a user. As shown in FIG. 2, device 10 is attachable proximate to the feet 12 of the user. Referring again to FIG. 1, the device 10 comprises a first magnetic body 14 adapted to attach proximate to a medial side of a left foot of the user (see FIG. 2) and a second magnetic body 16 adapted to attach proximate to a medial side of a right foot of the user (not shown) such that the first and second magnetic bodies 14 and 16 are oppositely disposed from one another across a median plane of the user in facing relation to one another. In this example each body 14, 16 is adapted to be positioned adjacent to a lateral malleolus of each foot respectively.

The first magnetic body 14 has a first magnetic pole 18 positionable facing away from the left foot 12, the second magnetic body 16 has a second magnetic pole 20 positionable facing away from the right foot. The first and second magnetic poles 18 and 20 have the same magnetic polarity to repel the right and left feet from one another when the first and second magnetic bodies 14 and 16 are in proximity to one another.

In the example embodiment 10 shown in FIG. 1, each first and second magnetic body 14, 16 comprises a pouch 22. A strap 24 is attached to the pouch 22 for cinching the pouch to one of the left or right legs. At least one magnet 26 is retained within the pouch 22. The pouch 22 further comprises a lug 28 positioned on a first side of the pouch, the strap 24 being positioned on a second side of the pouch opposite to the first side. In this example embodiment the strap 24 has a hook and loop type of attachment 30 wherein the hooks are positioned on a first side 32 of the strap and the loops are positioned on a second side 34 of the strap opposite to the first side. The strap 24 is sized to pass through the lug 28 and is folded over on itself to engage the hooks and loops and secure the pouch to the user's foot. Other forms of attachment using the strap are also feasible, for example, buckles and snap closures.

In this example embodiment the magnet 26 comprises a permanent magnet. As shown in FIGS. 1 and 2 the pouch 22 is adapted to receive a plurality of magnets 26 in side by side relation. FIG. 2 shows an embodiment comprising a plurality of magnets positioned within the pouch, in this example two magnets 26. Additional magnets are feasible.

In a practical example, permanent magnets 26 may be any practical shape such as round disks, toroidal (shown), square, and rectangular magnets. It is thought that neodymium or samarium cobalt magnets will provide sufficient strength to adequately repel the legs to provide proper gait control. The pouches 22 and straps 24 may be advantageously formed of woven polyester and polyurethane (Spandex) fibers for magnetic permeability, durability, adaptability and comfort of the user. The pouches and straps are not limited to these materials, and others may also be used.

Magnets 26 are arranged in each pouch 22 such that their first and second magnetic poles 18 and 20 face one another during use. The magnetic poles 18 and 20 have the same magnetic polarity (i.e., both north or both south poles face one another) to repel the right and left feet from one another when the first and second magnetic bodies 14 and 16 are in proximity to one another. The magnetic bodies are thus expected to prevent the feet from crossing over one another during the swing phase of the walking gait and thereby reduce the potential for falls due to tripping.

Figure 3:
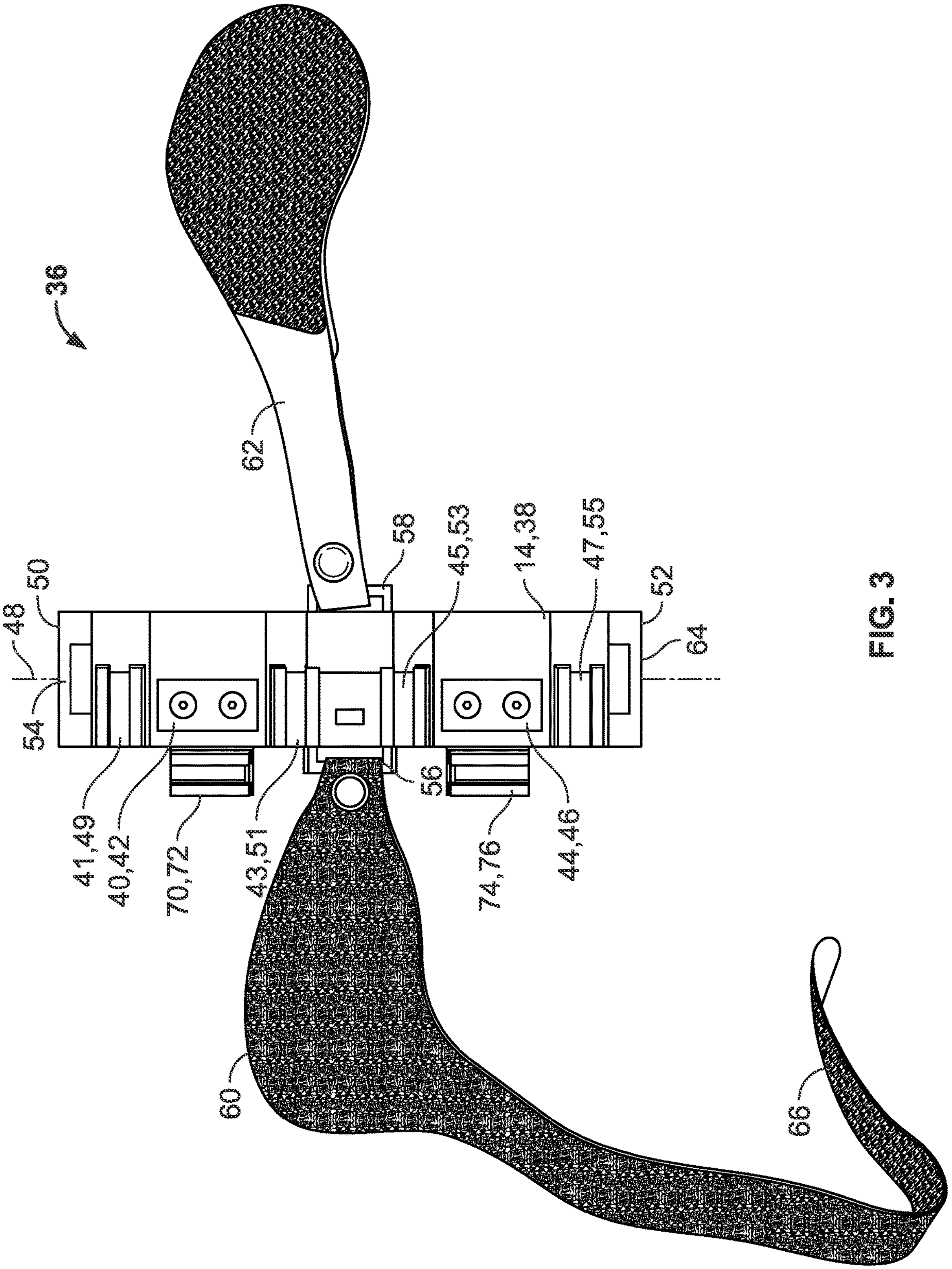
FIG. 3 is a side view of another embodiment of an example device for ambulatory gait control according to the invention.

FIG. 3 shows another embodiment of a device 36 for controlling aspects of a walking gait of a user wherein each of the first and second magnetic bodies 14 and 16 (14 shown) comprises a frame 38. Frame 38 defines a first compartment 40, and a first magnet 42 is received within the first compartment. Frame 38 also defines a second compartment 44, and a second magnet 46 is received within the second compartment. In this example embodiment the first and second compartments 40 and 44 are arranged adjacent to one another. Frame 38 has a centerline 48 extending from a first end 50 to a second end 52, and in this example embodiment the first and second compartments 40 and 44 are arranged offset from the centerline 48.

Figure 4:
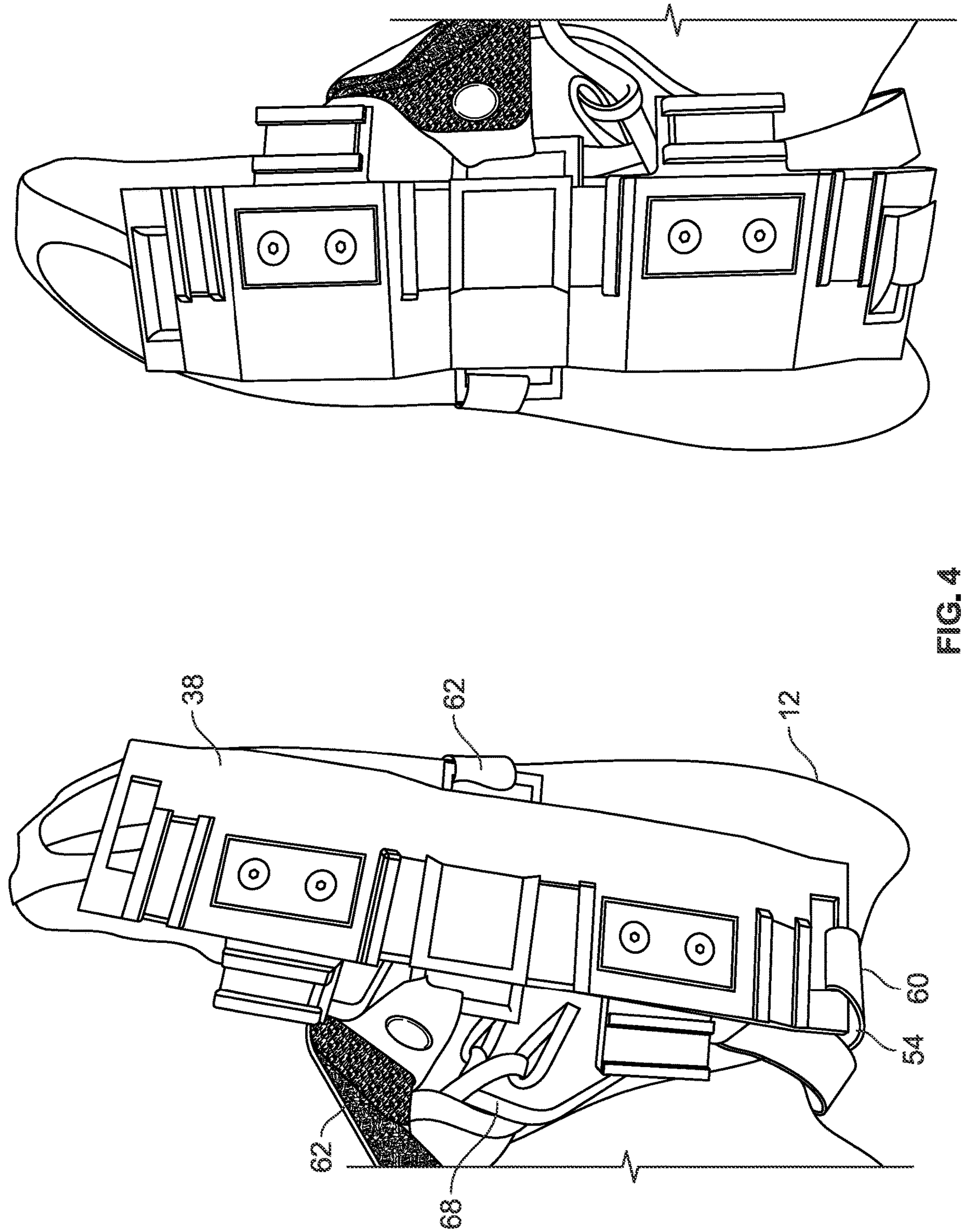
FIG. 4 is a plan view of the device shown in FIG. 3 being worn by a user.

A first lug 54 is positioned on the first end 50 of the frame 38 adjacent to the first compartment 40. A second lug 56 is positioned on a first side of the frame 38 and located between the first and second compartments 40 and 44. A third lug 58 is positioned on a second side of the frame 38 opposite to the second lug. A first strap 60 is attached to the second lug 56 and a second strap 62 is attached to the third lug 58. The first and second straps 60 and 62 are engageable with one another to affix the frame proximate to the medial sides of the feet 12 as shown in FIG. 4. The frame 38 of device 36 may comprise a fourth lug 64 positioned on the second end 52 of the frame adjacent to the second compartment 44.

Figure 5:
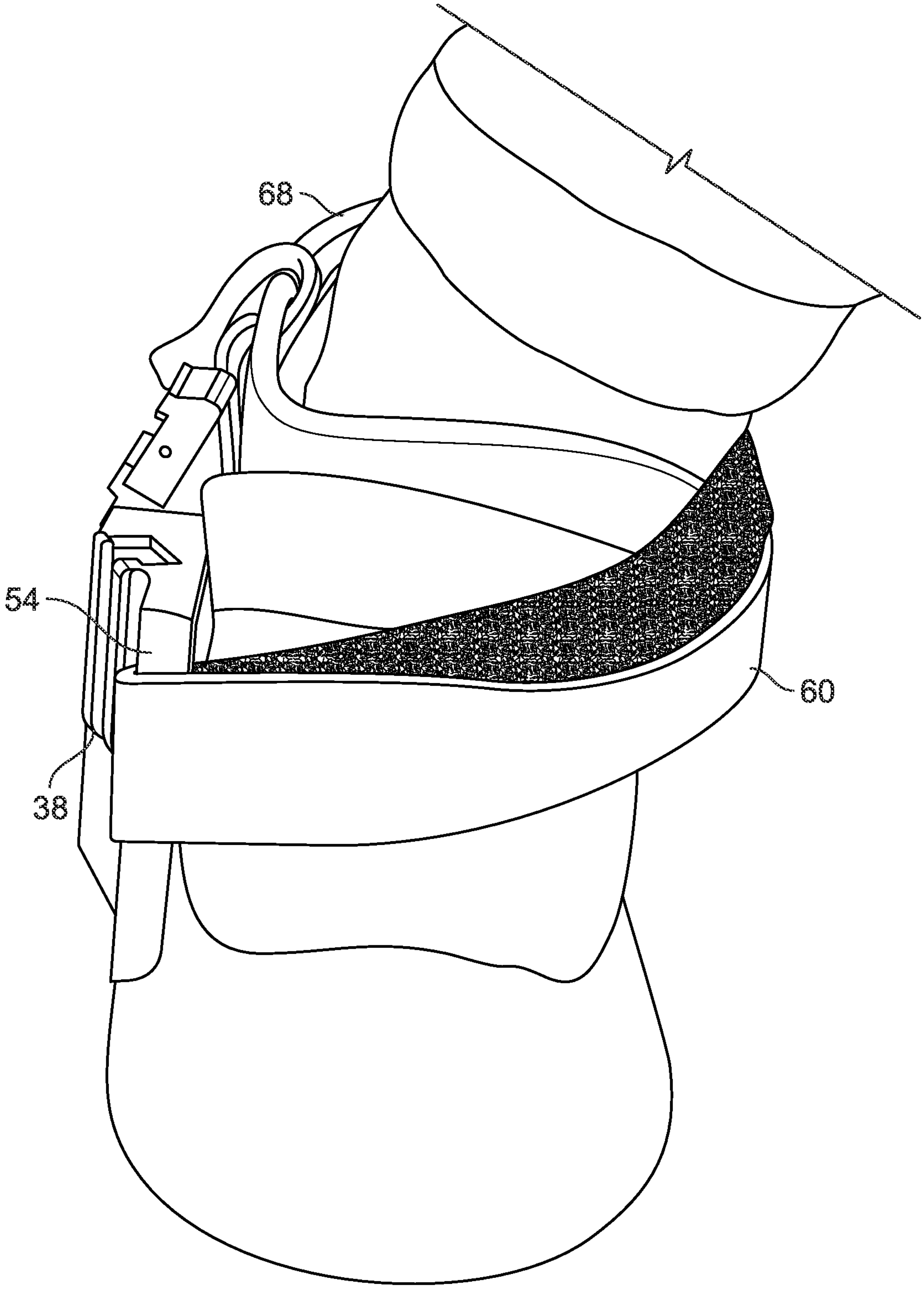
FIG. 5 is a rear view of the device shown in FIG. 3 being worn by a user.
Figure 6:
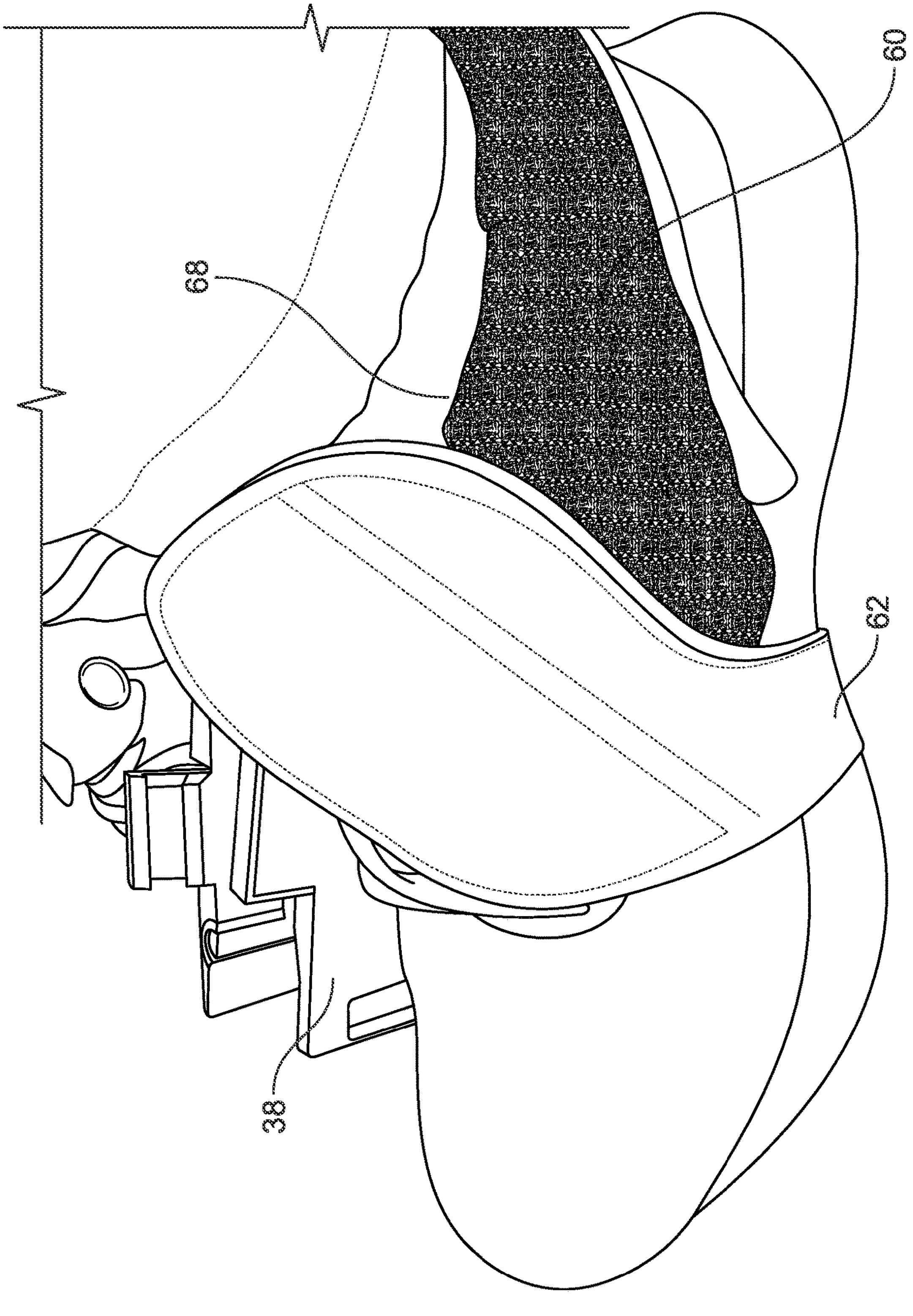
FIG. 6 is an isometric view of the device shown in FIG. 3 being worn by a user.

In the example embodiment 36 the first and second straps 60 and 62 comprise hook and loop fasteners 66, although other fasteners, such as snaps, laces and buckles are also feasible. As shown in FIGS. 4 through 6 the second straps 62 on each frame 38 are adapted to extend, respectively, beneath the left and right feet 12 of the user and pass over the feet to engage the first straps 60. The first straps 60 are adapted to extend, respectively around an anterior of ankles 68 of the left and right feet to engage the first lugs 54, each first strap 60 attaching to itself to affix the frames 38 proximate to the left and right feet 12, respectively.

As shown in FIG. 3, example device embodiment 36 may also comprise a third compartment 70 extending from the first side of the frame 38 adjacent to the first compartment 40. A third magnet 72 is received within the third compartment 70. A fourth compartment 74 may also extending from the first side of the frame 38 adjacent to the second compartment 44. A fourth magnet 76 is received within the fourth compartment 74. In this example embodiment the third and fourth magnets 72 and 76 are angularly oriented with respect to the first and second magnets 42 and 46, respectively.

Additionally, frame 38 may define a fifth compartment 41 positioned between lug 54 and compartment 40, a sixth compartment 43 positioned between compartment 40 and lugs 56 and 58, a seventh compartment 45 positioned between lugs 56 and 58 and compartment 44, and an eighth compartment 47 positioned between compartment 44 and lug 64. Each compartment, the fifth, sixth, seventh and eighth, receives a respective magnet 49, 51, 53, and 55. Magnets 49 and 51 are angularly oriented with respect to magnet 42 and magnets 53 and 55 are angularly oriented with respect to magnet 46. Compartments 41, 43, 45 and 47 may also be offset from the centerline 48.

It is advantageous if frame 38 comprises a non-magnetic material, such as a plastic resin. In a practical example the magnets may comprise permanent magnets such as described above for device embodiment 10. Device 36 operates in the same manner as described above, the outwardly facing magnetic poles 18 and 20 on the various magnets 42, 46, 74 and 76 being the same on each frame 38 and thus the frames are repelled from one another when in proximity to prevent the feet from crossing over one another during the swing phase of the walking gait and thereby reduce the potential for falls due to tripping.

Figure 7:
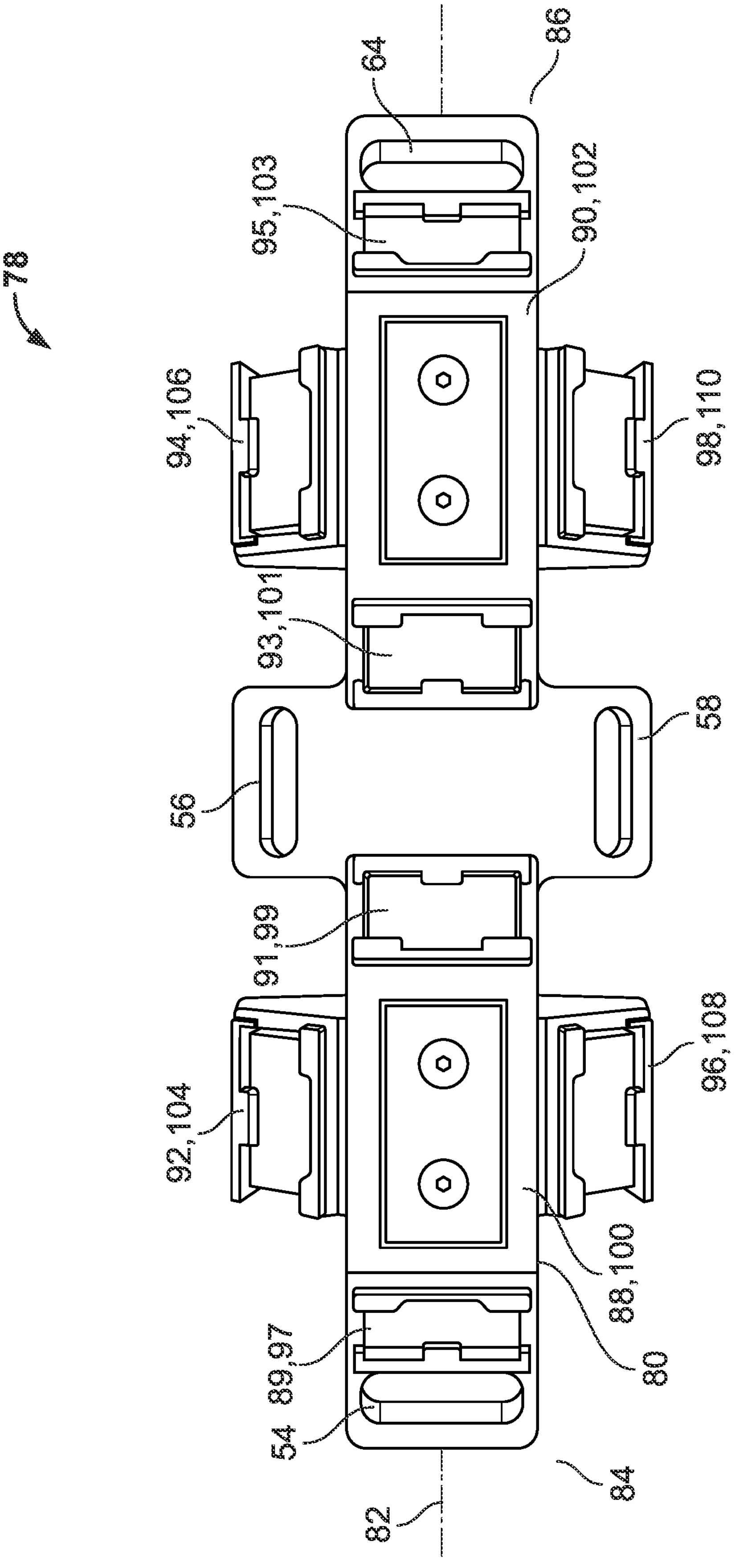
FIG. 7 is a plan view of another embodiment of an example device for ambulatory gait control according to the invention.

FIG. 7 illustrates another example device embodiment 78 according to the invention. Device 78 comprises a frame 80 having a centerline 82 extending from a first end 84 to a second end 86. Frame 80 defines first and second compartments 88 and 90 arranged in alignment with the centerline 82. In this example embodiment, a third compartment 92 extends from a first side of the frame 80 adjacent to the first compartment 88, a fourth compartment 94 extends from the first side of the frame 80 adjacent to the second compartment 90, a fifth compartment 96 extends from the second side of the frame 80 adjacent to the first compartment 88, and a sixth compartment 98 extends from the second side of the frame 80 adjacent to the second compartment 90. Each compartment 88, 90, 92, 94, 96, and 98 receives a respective magnet 100, 102, 104, 106, 108 and 110. In this example the third and fifth magnets 104 and 108 are angularly oriented with respect to the first magnet 100, and the fourth and sixth magnets 106 and 110 are angularly oriented with respect to the second magnet 102. Additionally, frame 80 may define a seventh compartment 89 positioned between lug 54 and compartment 88, an eighth compartment 91 positioned between compartment 88 and lugs 56 and 58, a ninth compartment 93 positioned between lugs 56 and 58 and compartment 90, and a tenth compartment 95 positioned between compartment 90 and lug 64. Each compartment, the seventh, eighth, ninth and tenth, receives a respective magnet 97, 99, 101, and 103. Magnets 97 and 99 are angularly oriented with respect to magnet 100 and magnets 101 and 103 are angularly oriented with respect to magnet 102.

As shown in FIG. 7, the frame 80 of embodiment 78 has the same lug arrangement as embodiment 36 which receives the same strap arrangement (not shown) to attach frames 80 to the left and right feet of a user. Embodiment 78 operates in the same manner as described above for embodiment 36.

Figure 8:
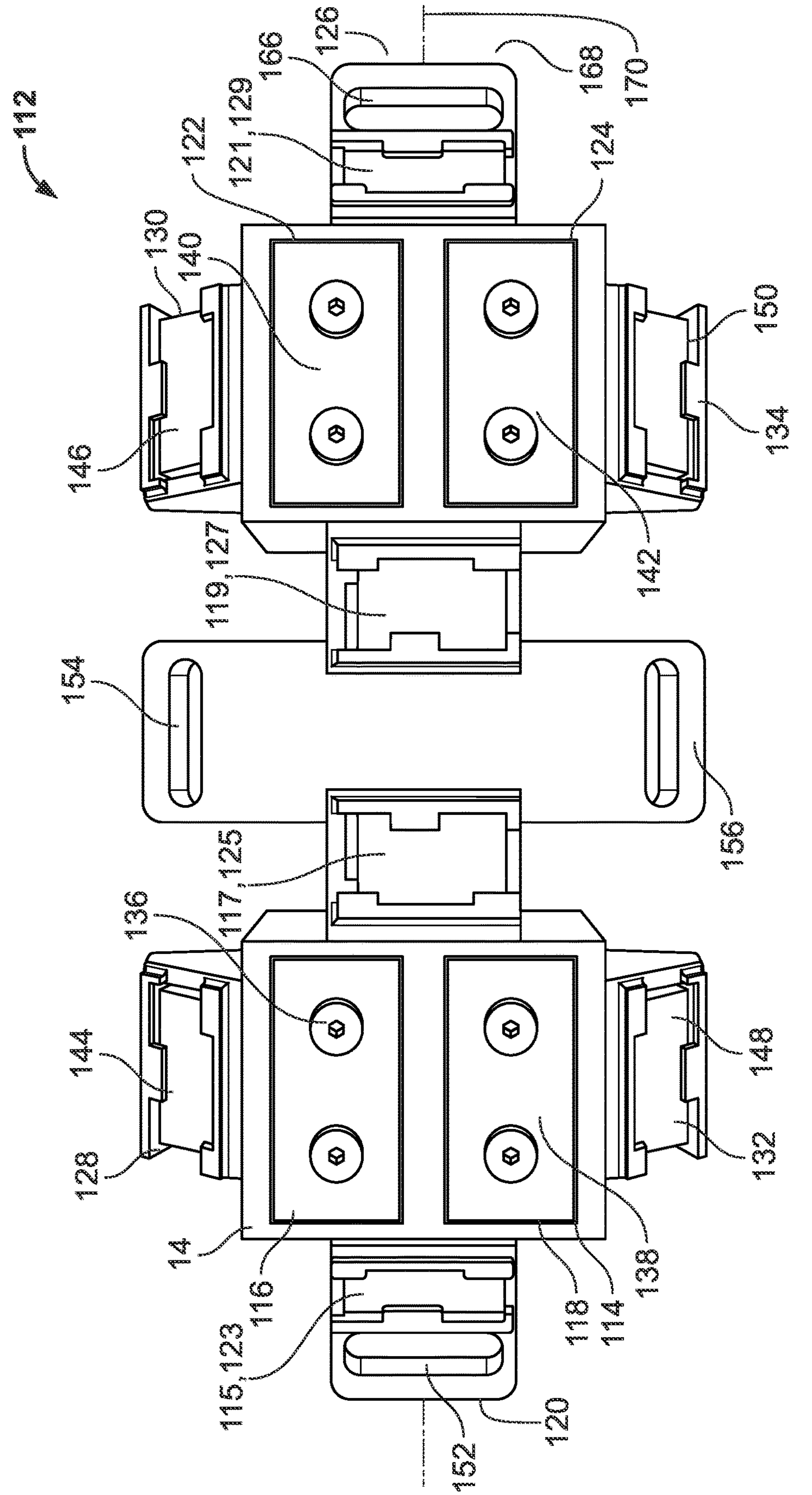
FIG. 8 is a plan view of another embodiment of an example device for ambulatory gait control according to the invention.
Figure 9:
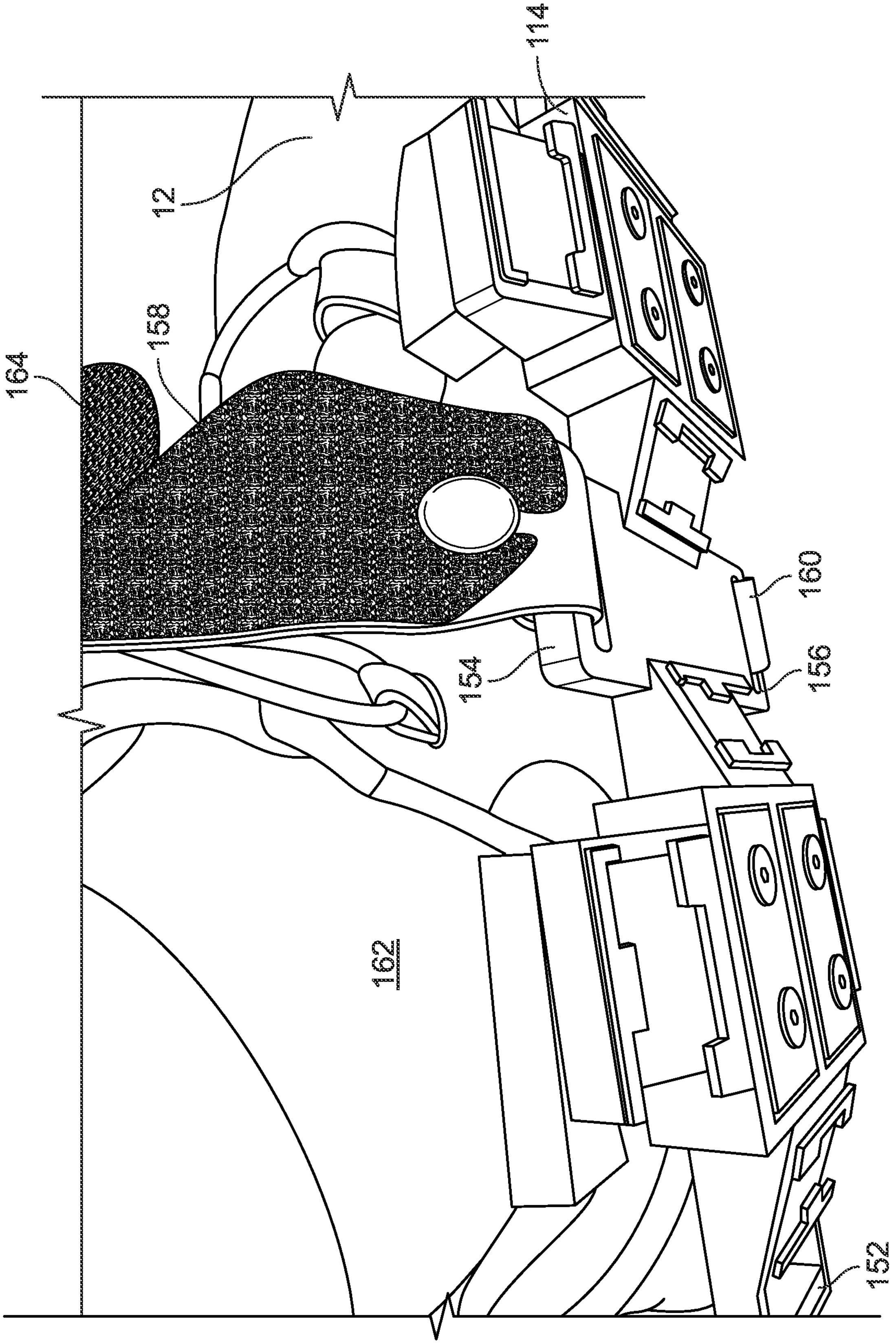
FIGS. 9 and 10 are isometric views of the device shown in FIG. 8 being worn by a user.
Figure 10:
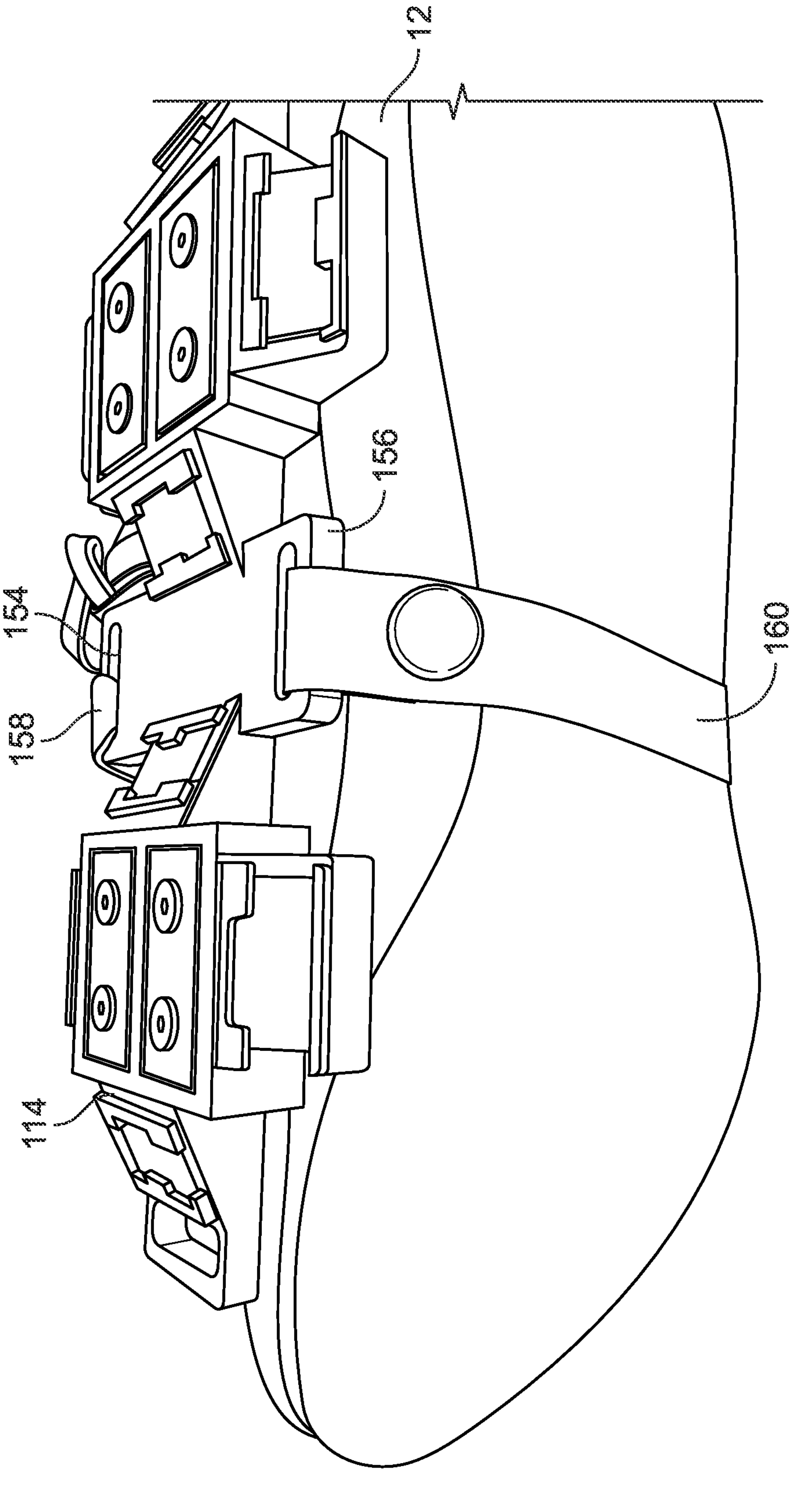

FIGS. 8-10 show another device embodiment 112 wherein each first and second magnetic bodies 14 and 16 (14 shown) comprise a frame 114. Frame 114 defines:

- a first compartment 116 and a second compartment 118, the first and second compartments being arranged adjacent to one another proximate a first end 120 of frame 114;
- a third compartment 122 and a fourth compartment 124, the third and fourth compartments being arranged adjacent to one another proximate to a second end 126 of frame 114 opposite to the first end 120;
- a fifth compartment 128 extending from a first side of the frame 114 adjacent to the first compartment 116;
- a sixth compartment 130 extending from the first side of the frame 114 adjacent to the third compartment 122;
- a seventh compartment 132 extending from a second side of the frame 114 adjacent to the second compartment 118; and
- an eighth compartment 134 extending from the second side of the frame 114 adjacent to the fourth compartment 124.

Each compartment receives a respective magnet 136, 138, 140, 142, 144, 146, 148 and 150.

Additionally, frame 114 may define:

- a ninth compartment 115 positioned between lug 152 and compartments 116 and 118;
- a tenth compartment 117 positioned between compartments 116 and 118 and lugs 154 and 156;
- an eleventh compartment 119 positioned between lugs 154 and 156 and compartments 122 and 124; and
- a twelfth compartment 121 positioned between compartments 122 and 124 and lug 166. Each compartment, the ninth, tenth, eleventh and twelfth, receives a respective magnet 123, 125, 127, and 129. Magnets 123 and 125 are angularly oriented with respect to magnets 136 and 138 and magnets 101 and 103 are angularly oriented with respect to magnets 140 and 142. Although twelve magnets are used in this embodiment, it is understood that this is in no way limiting, and serves only as an example.

FIG. 8 further shows a first lug 152 positioned on the first end 120 of the frame 114 adjacent to the first and second compartments 116, 118. A second lug 154 is positioned on a first side of the frame 114 and is located between the first and third compartments 116 and 132. A third lug 156 is positioned on a second side of the frame 114 opposite to the second lug 154 and is positioned between the second and fourth compartments 118 and 124. The lugs 152, 154 and 156 receive the same strap arrangement as described above for embodiment 36. As shown in FIGS. 9 and 10 a first strap 158 is attached to the second lug 154 and a second strap 160 is attached to the third lug 156. The first and second straps 158 and 160 are engageable with one another to affix the frame 114 proximate to the medial sides of the feet 12.

As further shown in FIGS. 9 and 10 the second straps 160 on each frame 114 are adapted to extend, respectively, beneath the left and right feet 12 of the user and pass over the feet to engage the first straps 158. The first straps 158 are adapted to extend, respectively around an anterior of ankles 162 of the left and right feet 12 to engage the first lugs 152. Each first strap attaches to itself to affix the frames 114 proximate to the left and right feet, respectively. As described above, hook and loop fasteners 164 are considered advantageous, but other attachments, such as buckles, snaps and laces are also feasible. In an example embodiment a fourth lug 166 (see FIG. 8) may be positioned on a second end 168 of the frame 112 adjacent to the third and fourth compartments 122 and 124.

In this example embodiment the frame 114 has a centerline 170 extending from the first end 120 to the second end 168. The first and second compartments 116 and 118 are arranged offset from the centerline 170 (on opposite sides), and the third and fourth compartments 122, 124 are also arranged offset from the centerline 170 (on opposite sides). Again, it is advantageous for the magnets 136, 138, 140, 142, 144, 146, 148 and 150 to comprise permanent magnets as described above. It is further advantageous if frame 114 comprises a non-magnetic material, such as a plastic resin. As shown in FIG. 8, magnet 144 is angularly oriented with respect to magnet 136, magnet 146 is angularly oriented with respect to magnet 140, magnet 148 is angularly oriented with respect to magnet 138 and magnet 150 is angularly oriented with respect to magnet 142.

Devices according to the invention are expected to be used advantageously in physical therapy for the following patients:

- patients with excessive muscle weakness causing the patient to perform hip adduction during swing phase of gait cycle;
- patients with past medical history of muscle atrophy caused by stroke or other neurological deficits;
- patients with neuropathy secondary to diabetes with sensory impairments;
- patients who demonstrate poor lower extremity control due to Parkinson's/Spinal cord injury;
- amputees;
- patients with degenerative muscle diseases;
- patients with Cerebral palsy; and
- patients who suffer from vertigo and balance deficits caused by both lower extremities instability.

Advantages expected when using devices according to the invention include:

- reduced potential for the patient crossing midline when ambulating;
- reduce fall risk by preventing patient from tripping;
- maintain safe gait cycle while using assistive devices such as walkers, canes and crutches by maintaining safe base of support;
- improved balance deficits when ambulating by reducing excessive hip adduction; and improved muscle facilitation through sensory-motor control during gait training.

All of the embodiments of the claimed invention described herein are provided expressly by way of example only. Innumerable variations and modifications may be made to the example embodiments described herein without departing from the concept of this disclosure. Additionally, the scope of this disclosure is intended to encompass any and all modifications and combinations of all elements, features, and aspects described in the specification and claims, and shown in the drawings. Any and all such modifications and combinations are intended to be within the scope of this disclosure.

What is claimed is:

1. A device for controlling aspects of a walking gait of a user, said device being attachable proximate to feet of said user, said device comprising:

a first magnetic body adapted to attach proximate to a medial side of a left foot of said user;

a second magnetic body adapted to attach proximate to a medial side of a right foot of said user such that said first and second magnetic bodies are oppositely disposed from one another across a median plane of said user in facing relation to one another, wherein said first magnetic body has a first magnetic pole facing away from said left foot, said second magnetic body has a second magnetic pole facing away from said right foot, said first and second magnetic poles having the same magnetic polarity to repel said right and left feet from one another when said first and second magnetic bodies are in proximity to one another, wherein each of said first and second magnetic bodies comprises a first strap and a second strap to attach said respective magnetic body to said respective foot of said user, wherein said first strap is adapted to extend beneath said respective foot of said user and pass over said respective foot of said user to engage said second strap.

2. The device according to claim 1, wherein each of said first and second magnetic bodies comprises:

a pouch; and at least one magnet retained within said pouch, wherein at least one of said first or said second straps is coupled to said pouch.

3. The device according to claim 2, wherein each said pouch is adapted to be positioned adjacent to a lateral malleolus of each said foot respectively.

4. The device according to claim 2, wherein said at least one magnet comprises a permanent magnet.

5. The device according to claim 2, wherein said pouch further comprises a lug positioned on a first side of said pouch, said strap being positioned on a second side of said pouch opposite to said first side, said strap having a hook and loop attachment wherein said hooks are positioned on a first side of said strap and said loops are positioned on a second side of said strap opposite to said first side, said strap being sized to pass through said lug.

6. The device according to claim 2, wherein said pouch is adapted to receive a plurality of said magnets in side by side relation.

7. The device according to claim 6, further comprising a plurality of said magnets positioned within said pouch.

8. The device according to claim 7, comprising two of said magnets positioned within said pouch.

9. A device for controlling aspects of a walking gait of a user, said device being attachable proximate to feet of said user, said device comprising:

a first magnetic body adapted to attach proximate to a medial side of a left foot of said user;

a second magnetic body adapted to attach proximate to a medial side of a right foot of said user such that said first and second magnetic bodies are oppositely disposed from one another across a median plane of said user in facing relation to one another, wherein said first magnetic body has a first magnetic pole facing away from said left foot, said second magnetic body has a second magnetic pole facing away from said right foot, said first and second magnetic poles having the same magnetic polarity to repel said right and left feet from one another when said first and second magnetic bodies are in proximity to one another, wherein each of said first and second magnetic bodies comprises:

a frame;

a first compartment defined by said frame and a first magnet received within said first compartment; and a second compartment defined by said frame and a second magnet received within said second compartment, said first and second compartments being arranged adjacent to one another.

10. The device according to claim 9, wherein each of said first and second magnetic bodies further comprises:

a first lug positioned on a first end of said frame adjacent to said first compartment;

a second lug positioned on a first side of said frame and located between said first and second compartments;

a third lug positioned on a second side of said frame opposite to said second lug;

a first strap attached to said second lug;

a second strap attached to said third lug, said first and second straps being engageable with one another to affix said frame proximate to said medial sides of said feet.

11. The device according to claim 10, wherein said first and second straps comprise hook and loop fasteners.

12. The device according to claim 10, wherein said first straps on each said frame are adapted to extend, respectively, beneath said left and right feet of said user and pass over said feet to engage said second straps.

13. The device according to claim 12, wherein said second straps are adapted to extend, respectively around an anterior of ankles of said left and right feet to engage said first lugs, each said second strap attaching to itself to affix said frames proximate to said left and right feet, respectively.

14. The device according to claim 10, wherein said frame comprises a fourth lug positioned on a second end of said frame adjacent to said second compartment.

15. The device according to claim 9, wherein said frame comprises a non-magnetic material.

16. The device according to claim 9, wherein said first and second magnets comprise permanent magnets.

17. The device according to claim 9, wherein said frame has a centerline extending from said first to said second ends, said first and second compartments being arranged offset from said centerline.

18. The device according to claim 17, further comprising:

a third compartment extending from said first side of said frame adjacent to said first compartment, a third magnet being received within said third compartment;

a fourth compartment extending from said first side of said frame adjacent to said second compartment, a fourth magnet being received within said fourth compartment.

19. The device according to claim 18, wherein said third and fourth magnets are angularly oriented with respect to said first and second magnets, respectively.

20. The device according to claim 9, further comprising:

a third compartment extending from said first side of said frame adjacent to said first compartment, a third magnet being received within said third compartment;

a fourth compartment extending from said first side of said frame adjacent to said second compartment, a fourth magnet being received within said fourth compartment;

a fifth compartment extending from said second side of said frame adjacent to said first compartment, a fifth magnet being received within said fifth compartment;

a sixth compartment extending from said second side of said frame adjacent to said second compartment, a sixth magnet being received within said sixth compartment.

21. The device according to claim 20, wherein said third and fifth magnets are angularly oriented with respect to said first magnet and said fourth and sixth magnets are angularly oriented with respect to said second magnet.

22. The device according to claim 9, wherein each of said first and second magnetic bodies further comprises:

a third compartment defined by said frame and a third magnet received within said third compartment;

a fourth compartment defined by said frame and a fourth magnet received within said fourth compartment, said third and fourth compartments being arranged adjacent to one another;

a first lug positioned on a first end of said frame adjacent to said first and second compartments;

a second lug positioned on a first side of said frame and located between said first and third compartments;

a third lug positioned on a second side of said frame opposite to said second lug and positioned between said second and fourth compartments;

a first strap attached to said second lug;

a second strap attached to said third lug, said first and second straps being engageable with one another to affix said frame proximate to said medial sides of said feet.

23. The device according to claim 22, wherein said first and second straps comprise hook and loop fasteners.

24. The device according to claim 22, wherein said first straps on each said frame are adapted to extend, respectively, beneath said left and right feet of said user and pass over said feet to engage said second straps.

25. The device according to claim 24, wherein said second straps are adapted to extend, respectively around an anterior of ankles of said left and right feet to engage said first lugs, each said second strap attaching to itself to affix said frames proximate to said left and right feet, respectively.

26. The device according to claim 22, wherein said frame comprises a fourth lug positioned on a second end of said frame adjacent to said third and fourth compartments.

27. The device according to claim 22, wherein said frame comprises a non-magnetic material.

28. The device according to claim 22, wherein said first, second, third and fourth magnets comprise permanent magnets.

29. The device according to claim 22, wherein said frame has a centerline extending from said first to said second ends, said first and second compartments being arranged offset from said centerline, said third and fourth compartments being arranged offset from said centerline.

30. The device according to claim 29, further comprising:

a fifth compartment extending from said first side of said frame adjacent to said first compartment, a fifth magnet being received within said fifth compartment;

a sixth compartment extending from said first side of said frame adjacent to said third compartment, a sixth magnet being received within said sixth compartment;

a seventh compartment extending from said second side of said frame adjacent to said second compartment, a seventh magnet being received within said seventh compartment;

an eighth compartment extending from said second side of said frame adjacent to said fourth compartment, an eighth magnet being received within said eighth compartment.

31. The device according to claim 30, further comprising:

a ninth compartment positioned between said first lug and said first and second compartments, a ninth magnet being received within said ninth compartment;

a tenth compartment positioned between said first and second compartments and said second and third lugs, a tenth magnet being received within said tenth compartment;

an eleventh compartment positioned between said second and third lugs and said third and fourth compartments, an eleventh magnet being received within said eleventh compartment; and a twelfth compartment positioned between said second and third compartments and a fourth lug positioned on a second end of said frame adjacent to said second and third compartments, a twelfth magnet being received within said twelfth compartment.

* * * * *